United States Patent [19]

Saliba

[11] Patent Number: 5,475,553
[45] Date of Patent: Dec. 12, 1995

[54] TAPE HEAD WITH SELF-REGULATING WEAR REGIONS

[75] Inventor: George Saliba, Northboro, Mass.

[73] Assignee: Quantum Corporation, Milpitas, Calif.

[21] Appl. No.: 305,117

[22] Filed: Sep. 13, 1994

Related U.S. Application Data

[63] Continuation of Ser. No. 94,661, Jul. 19, 1993, abandoned.

[51] Int. Cl.⁶ .................................................. G11B 5/255
[52] U.S. Cl. ........................................................ 360/122
[58] Field of Search ................................. 360/122, 119, 360/107, 121, 126, 127, 104

[56] References Cited

U.S. PATENT DOCUMENTS

| | | | |
|---|---|---|---|
| 4,300,179 | 11/1981 | Barnes et al. | 360/127 |
| 4,686,596 | 8/1987 | Kraemer et al. | 360/126 |
| 4,695,909 | 9/1987 | Momata et al. | 360/122 |
| 4,949,208 | 8/1990 | Milo et al. | 360/122 |
| 5,008,767 | 4/1991 | Iwata et al. | 360/122 |
| 5,049,454 | 9/1991 | Johnson et al. | 360/122 |
| 5,055,959 | 10/1991 | Saliba | 360/122 |

FOREIGN PATENT DOCUMENTS

| | | |
|---|---|---|
| 0437147A2 | 7/1991 | European Pat. Off. . |
| 0439943A2 | 8/1991 | European Pat. Off. . |
| 0550890A2 | 7/1993 | European Pat. Off. . |
| 62-259208(A) | 11/1987 | Japan . |
| 63-231707(A) | 9/1988 | Japan . |
| WO81/00780 | 3/1981 | WIPO . |
| WO89/06420 | 7/1989 | WIPO . |

OTHER PUBLICATIONS

"Magnetic Head", *Patent Abstracts of Japan*, vol. 15, No. 363 (P-1251) 12 Sep. 1991.
"Magnetic Head Construction", *IBM Tech. Discl. Bulletin*, vol. 19, No. 2, Jul. 1976, p. 397.

*Primary Examiner*—Robert S. Tupper
*Attorney, Agent, or Firm*—David B. Harrison

[57] ABSTRACT

A magnetic head and a method of producing a magnetic head for use with magnetic contact recording media which passes over the magnetic head in contact therewith, thus, exerting a pressure on the magnetic head. The magnetic head includes a transducer support having a side with two generally coplanar raised elongated facing surfaces which have a space between them and are generally aligned along a longitudinal axis which is transverse to the direction in which the media travels across the magnetic head. The magnetic head further includes a core located in the space between the two facing surfaces. The core has an elongated surface which extends in the direction in which the media travels to a greater extent than at least a portion of the facing surfaces. The core also has a transducer element embedded within it. The combination of the facing surfaces, the elongated surface of the core and the transducer element form a generally coplanar wear surface. The dimensions of the wear surface which extend in the media travel direction are selected to effect a predetermined wear of the wear surface as the media advances across the wear surface.

6 Claims, 15 Drawing Sheets

TAPE HEAD WITH SELF-REGULATING WEAR REGIONS

This application is a continuation, of application Ser. No. 08/094,661, filed Jul. 19, 1993, now abandoned.

BACKGROUND OF THE INVENTION

This invention relates to magnetic head assemblies for use in conjunction with magnetic contact recording media.

Magnetic head assemblies typically contain one or more raised strips or supports which have surfaces over which the magnetic recording media passes. Embedded in each support surface is a transducer which may be a recording transducer (i.e. recording or writing head) for writing information (i.e., bits of data) onto the media or a reproducing transducer (i.e., reproducing or reading head) for reading information from the media. An embedded recording transducer produces a magnetic field in the vicinity of a small gap in the core of the recording transducer which causes information to be stored on the magnetic media as it streams across the support surface. In contrast, a reproducing transducer detects a magnetic field near the surface of the magnetic media in the vicinity of a small gap as the media streams over the support surface.

There is typically some microscopic separation between the gap of the transducer core and the recording media. This separation reduces the magnetic field coupling between the recording transducer and the media during writing and between the media and the reproducing transducer during reading. The magnetic field coupling is proportional to $e^{-kd/\lambda}$, where d is the head-to-media separation, $\lambda$ is the recording wavelength, and k is a constant. The magnetic field coupling decreases exponentially both with respect to increases in the separation between the media and the support and with respect to increases in the recording density. The amount of media area required to store a bit of data is one factor in determining recording density and the recording wavelength $\lambda$. As less media area is required to store a bit of data, the recording density increases and inversely, the recording wavelength $\lambda$ decreases. Thus, a limited amount of head-to-media separation may be acceptable at low recording densities, such as 10–20 KFCI, where the recording wavelength $\lambda$ is large enough to provide sufficient magnetic coupling. However, at higher densities, such as 40–80 KFCI, substantially no head-to-media separation can be tolerated or the magnetic coupling will be insufficient.

During operation when the magnetic media is magnetic recording tape, a uniform tension is applied to the tape as the tape passes at a wrap angle around a support and transducer core surface having a uniform height and a uniform width. It is desirable to keep the tape in intimate contact with the transducer core, and specifically, in contact with a gap in the core, and thus, minimize "spacing loss".

The tape exerts a pressure against the support surface that is uniform along a longitudinal axis of the support. The pressure is essentially proportional to the tension and the wrap angle and inversely proportional to the support width. In this regard, increased pressure reduces "spacing loss".

Tape pressure against the support surface can be modified. For example, the pressure can be changed by modifying the tension in the tape, by modifying the wrap angle of the tape on the support surface, or by modifying the width of the support surface. Accordingly, pressure on the support surface can be increased by increasing the tension in the tape, by increasing the wrap angle of the tape on the support surface, or by decreasing the width of the support surface.

However, increased pressure has negative consequences. For example, increased pressure reduces tape life and increases the possibility of tape damage and data loss. Additionally, increased pressure causes the support surface to wear down more quickly which results in a shorted head life. Moreover, increased pressure can result in uneven wear along the support surface. Uneven wear can be particularly troublesome between regions of the support with the transducer and without the transducer where depressions may be formed in the support surface which may make spacing loss unavoidable.

SUMMARY OF THE INVENTION

A magnetic head in accordance with the principles of the invention is for use with magnetic contact recording media which passes over the magnetic head in contact with the magnetic head and thus, exerts a pressure on the magnetic head. The magnetic head includes a transducer support having a side with two generally coplanar raised elongated facing surfaces which have a space between them and are generally aligned along a longitudinal axis which is transverse to the direction in which the media travels across the magnetic head.

The magnetic head further includes a core located in the space between the two facing surfaces. The core has an elongated surface which is generally coplanar with the facing surfaces and extends in the direction in which the media travels to a greater extent than the facing surfaces. The core also has a transducer element embedded within it. The transducer element may be a ferrite core induction head, a thin film head, or a magneto resistive head, etc.

The combination of the facing surfaces, the elongated surface of the core and the transducer element form a generally coplanar wear surface. The dimension of the elongated surface extending in the media travel direction is selected to effect a predetermined wear of the wear surface as the media advances across the wear surface.

The invention further includes a method of manufacturing a magnetic head for use with magnetic contact recording media. The method includes the steps of supplying a transducer support and grinding a surface of the transducer support such that a raised, elongated facing surface is provided which is transverse to the direction in which the media travels across the magnetic head and against which the media exerts pressure as it advances across the magnetic head. The method further includes the step of slotting the transducer support and facing surface in a direction transverse to a longitudinal axis of the facing surface such that the facing surface is divided into two coplanar facing surfaces with a space between them.

A core is then inserted in the space between the two facing surfaces. The core has an elongated surface which extends in the direction in which the media travels to a greater extent than the facing surfaces and has a transducer element embedded within it. The combination of the facing surfaces, the elongated surface and the transducer element form a generally coplanar wear surface, and the dimension of the elongated surface extending in the media travel direction is selected to effect a predetermined wear of the wear surface as the media advances across the wear surface.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF THE PREFERRED EMBODIMENT

Figure 1:
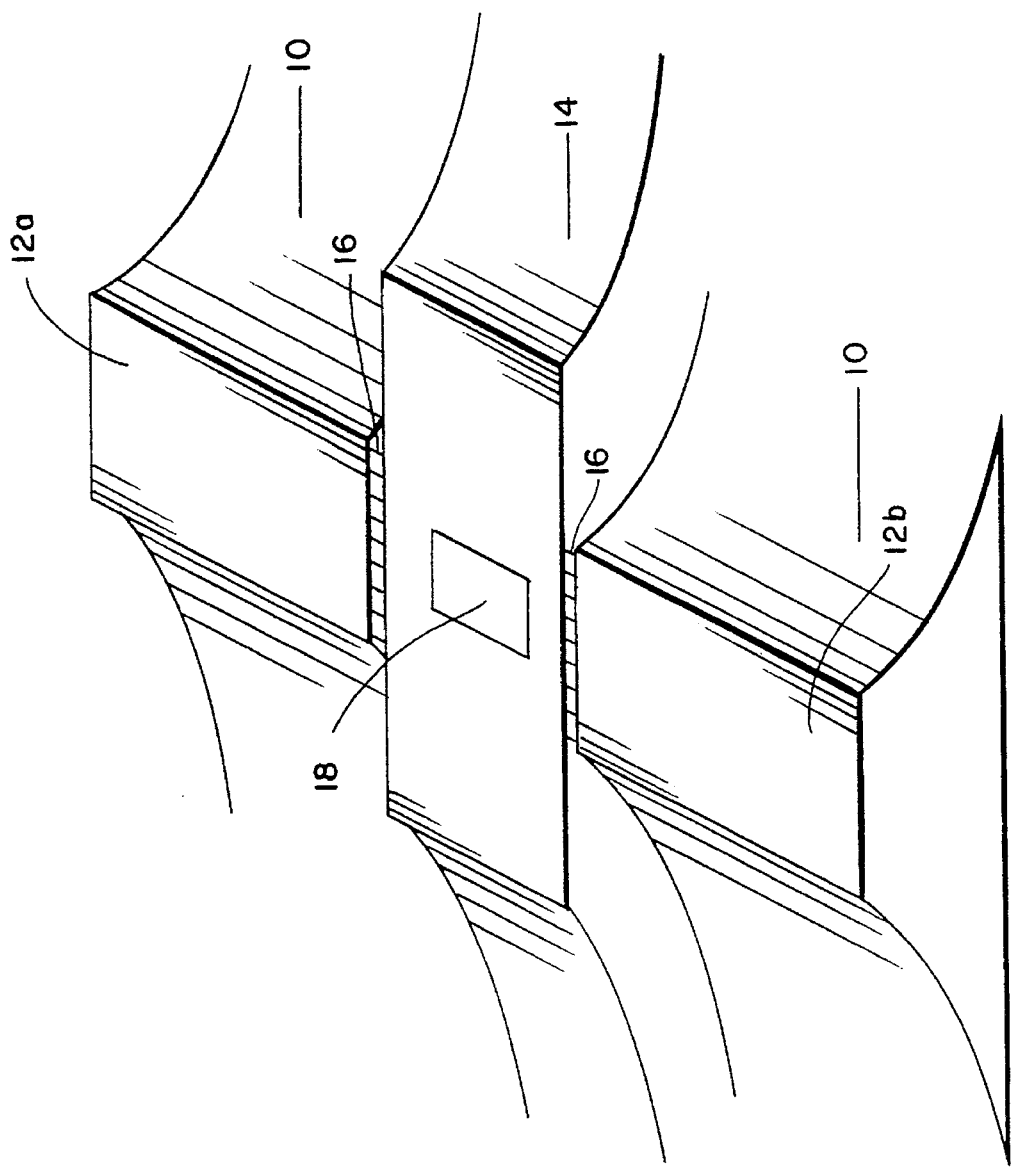
FIG. 1 is an enlarged isometric view of a magnetic contact recording head according to the principles of the invention.

Referring to FIG. 1, one embodiment of a magnetic head according to the invention includes a transducer support 10 with facing surfaces 12a, 12b and a transducer core 14 secured within the transducer support 10 and between the facing surfaces 12a, 12b through the use of a nonmagnetic material 16. The core 14 is further shown to have a transducing element 18. The magnetic head of the invention is for use with magnetic contact recording media, and by way of example, the transducer element 18 may be a ferrite or metal in gap ferrite (i.e., M.I.G.) core inductive head, a magneto resistive read element, or a thin film gap head.

In a preferred embodiment which will be described below in detail, the magnetic head is a magnetic tape head for use in a tape head assembly. However, the magnetic head may be used with other types of magnetic contact recording media such as floppy disks or contact hard disks.

Figure 3:
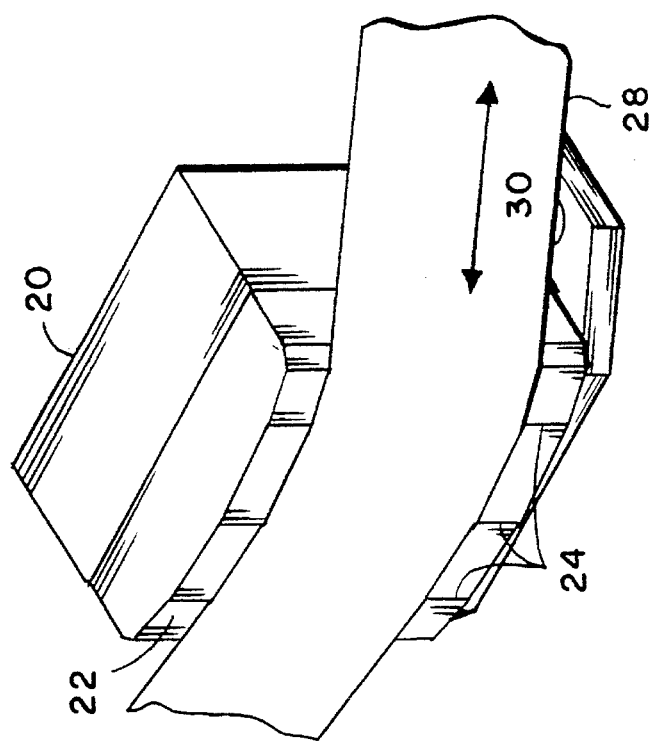
FIG. 3 is an isometric view of the linear magnetic tape head assembly shown in FIG. 2 further showing a magnetic tape being advanced across it.
Figure 2:
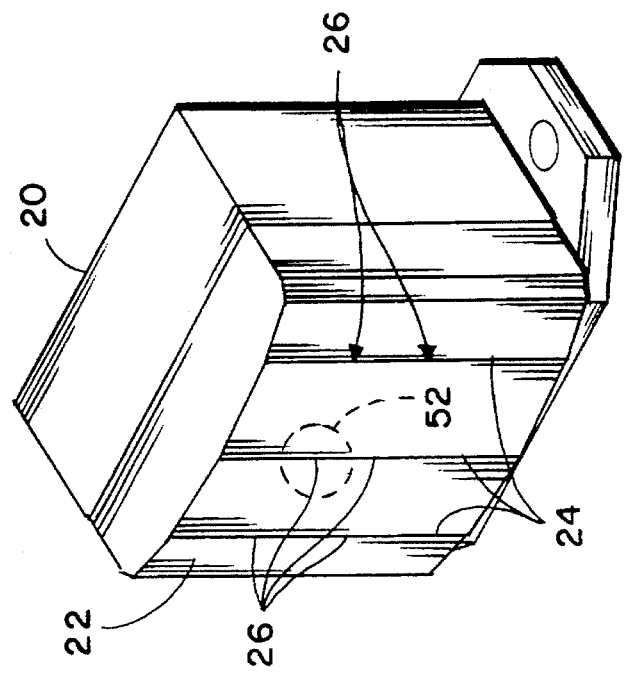
FIG. 2 is an isometric view of a linear magnetic tape head assembly according to the principles of the invention.

Referring to FIGS. 2 and 3, one embodiment of the invention includes a linear tape head assembly 20 with a tape facing surface 22, three transducer supports 24, and six cores 26 over which a magnetic recording tape 28, shown in FIG. 3, passes at a predetermined tension in the tape travel direction indicated by arrow 30. In all figures, like reference numerals refer to like elements. Each transducer support 24 and core 26 are made of the same magnetic material and provide a wear surface over which the tape 28 passes. The cores 26 are each one element in a transducer which may be a recording transducer or reproducing transducer. Each recording transducer provides a magnetic field in the vicinity of a gap (not shown) in the surface of the core 26. Each reproducing transducer detects a magnetic field near the surface of the magnetic tape 28 in the vicinity of a gap (not shown).

Figure 4:
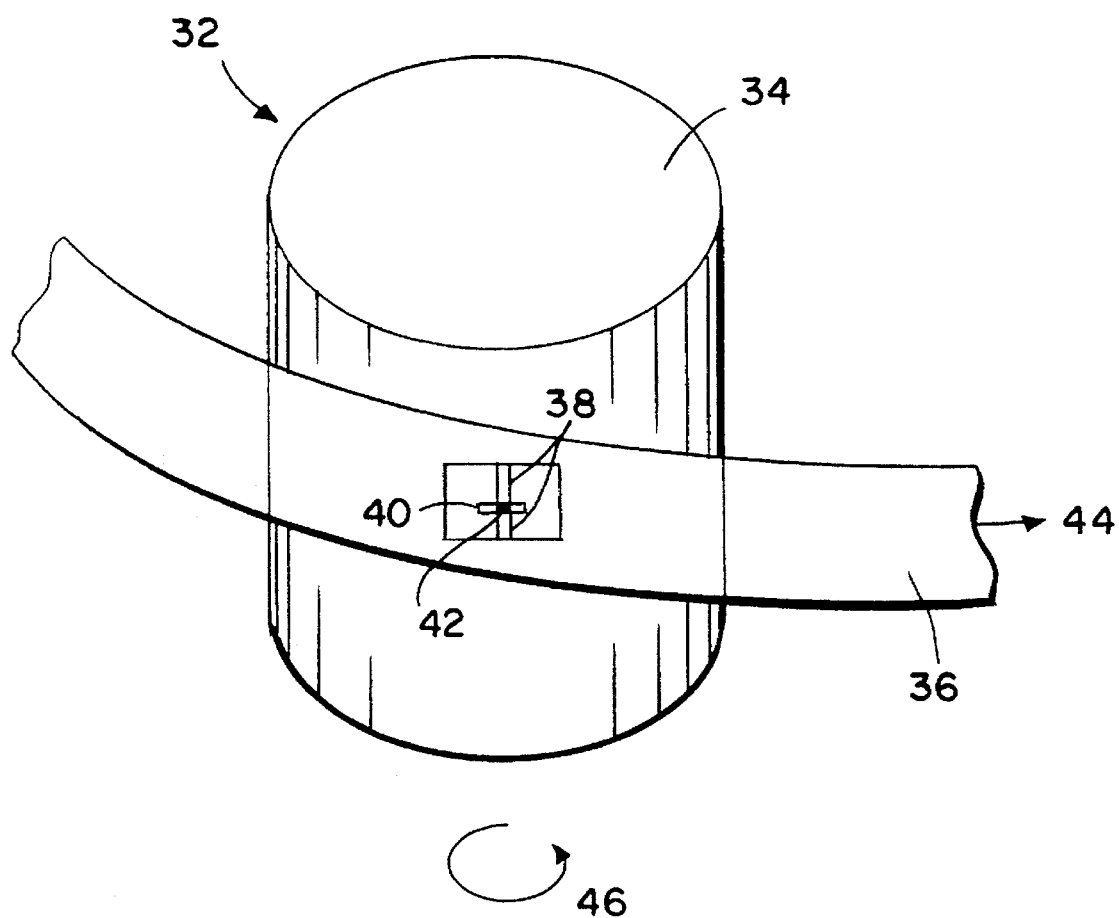
FIG. 4 is an isometric view of helical magnetic tape head.

The linear tape head assembly 20 is by way of example and it is to be understood that other types of tape head assemblies could be used. For example, FIG. 4 shows a helical tape drive assembly 32 including a rotating magnetic tape head 34. Rotating magnetic tape head 34 records information in helical form on a magnetic recording tape 36 and reproduces information from the helical form stored on the magnetic recording tape 36. The rotating magnetic tape head 34 includes a transducer support 38, a core 40, and a transducer element 42 over which the tape 36 passes in a direction indicated by arrow 42 as the rotating magnetic tape head 34 rotates in a direction indicated by arrow 44.

The magnetic head according to the invention will now be described in detail with reference to a linear tape drive assembly using a ferrite core inductive head. However, as previously mentioned, the magnetic head of the invention may be used with other types of transducer elements, recording media, and tape drive assemblies.

Figure 5:
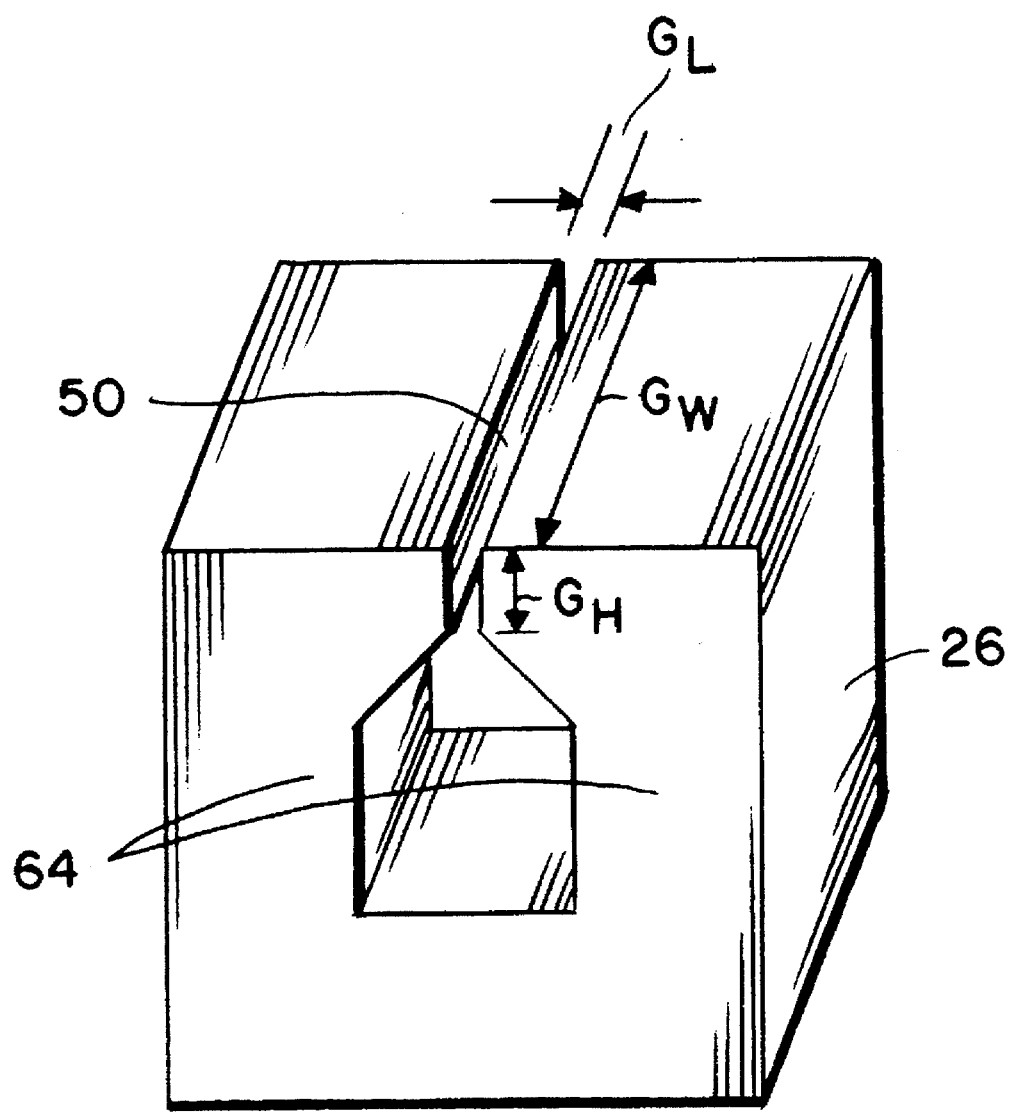
FIG. 5 is an enlarged isometric view of one embodiment of a transducer core according to the principles of the invention.

Referring to FIG. 5, a typical ferrite core 26 is shown. The core 26 has a gap 50 which has a gap length G1, a gap width Gw, and a gap height Gh. The gap height Gh is also commonly referred to as the pole tip height or throat height and will herein after be referred to as the pole tip height Gh. The gap width is generally equal to the width of one of a plurality of tracks on the tape (i.e., tape track width) which is approximately two millinches. The gap length is approximately ten microinches.

Figure 6:
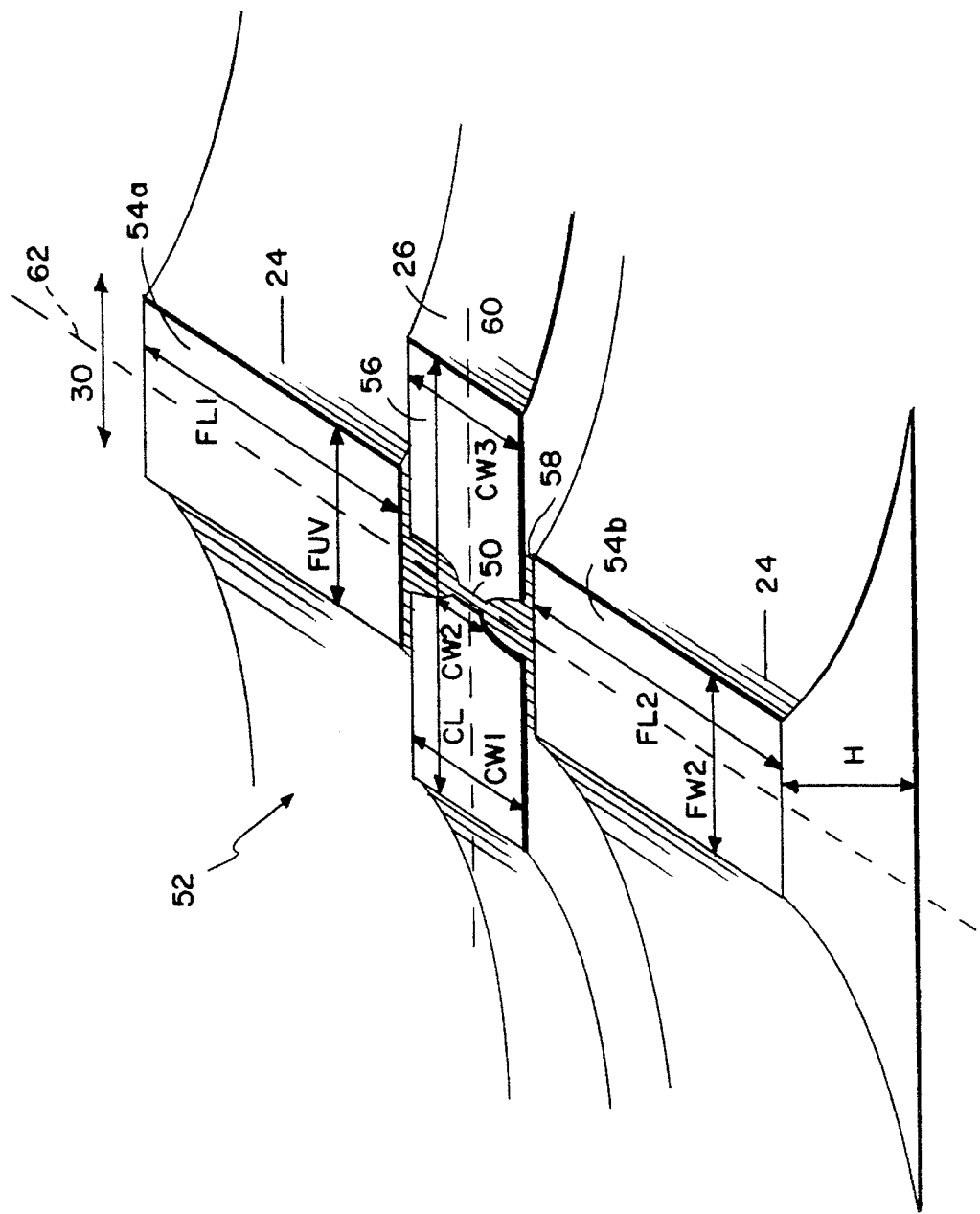
FIG. 6 is a more detailed enlarged isometric view of the magnetic contact recording head shown in FIG. 1.

FIG. 6 shows an enlarged view of a portion of the transducer support 24 and the core 26 shown in dashed outline 52 of FIG. 2. The transducer support 24 has two facing surfaces 54a, 54b which are raised with respect to the remaining portion of the transducer support 24, and the core 26 has an elongated surface 56 with the gap 50 centered between the facing surfaces 54a, 54b. The core 26 is secured within the transducer support 24 through the use of a nonmagnetic material 58.

In the preferred embodiment of the invention, the magnetic material of the core 26 and the transducer support 24 is ferrite and the nonmagnetic material 58 is glass. However, other types of magnetic material, such as nickel zinc or magnesium zinc, may be used, and other types of nonmagnetic materials may be used, such as calcium titinate, nonmagnetic ferrite, or barium titinate. Glass is a composite nonmagnetic material, and thus, there are many different types of glass.

In general, glass is not as strong as ferrite, and hence, an area of glass will wear more quickly than an equal area of ferrite as the tape advances across the area. However, when considering the wear of the entire surface, hereinafter referred to as the wear surface, as shown in FIG. 6, the proportion of the area of the nonmagnetic material 58 is insignificant (i.e., approximately five to 20 percent) when compared to the proportion of the area of the magnetic material of the elongated surface 56 and the facing surfaces 54a, 54b. Thus, any nonmagnetic material may be used without significantly affecting the rate of wear of the wear surface.

Figure 7:
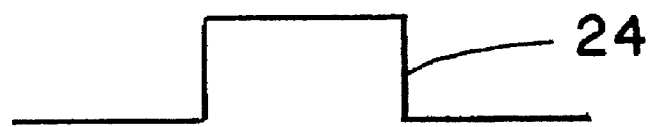
FIG. 7 is a side elevation view of a flat coplanar wear surface of a magnetic contact recording head according to the principles of the invention.
Figure 8:
FIG. 8 is a side elevation view of a curved coplanar wear surface of a magnetic contact recording head according to the principles of the invention.

The transducer support 24 and the core 26 each have an identical height H such that the facing surfaces 54a, 54b and the elongated surface 56 are substantially coplanar. If the magnetic head is used in a contact recording disk drive assembly, then the elongated surface 56 and the facing surfaces 54a, 54b will provide a flat coplanar surface, a side view of which is shown in FIG. 7. If the magnetic head is used in a contact recording tape drive assembly, then the elongated surface 56 and the facing surfaces 54a, 54b will provide a curved coplanar surface, a side view of which is shown in FIG. 8.

Referring back to FIG. 6, by way of example, the elongated surface 56 is shown to be rectangular and have a longitudinal axis 60 which is perpendicular to the longitudinal axis 62 of the facing surfaces 54a, 54b. This results in the wear surface having two narrow regions comprising the facing surfaces 54a, 54b which each have a width FW1, FW2, respectively, and a wider region comprising the elongated surface 56 which has a length CL. The longitudinal axis 60 of the elongated surface 56 is parallel to the tape travel direction 30 such that the gap 50 is perpendicular to the tape travel direction.

By way of example, the wider region of the wear surface relative to longitudinal axis 62 is shown to be entirely made up of the elongated surface 56 of the core 26. As will be described below, other embodiments of the wider region include a combination of the transducer support 24 and the elongated surface 26.

The technique of providing a wider tape wear surface in a first region surrounding a transducer, and a more narrow wear surface in a second region located away from the region surrounding the transducer is described in U.S. Pat. No. 5,055,959, entitled "Tape Head With Low Spacing Loss Produced By Narrow and Wide Wear Regions". U.S. Pat. No. 5,055,959 is assigned to the same assignee of the present invention, Digital Equipment Corporation, and was invented by the same inventor, George A. Saliba, as the present invention and is hereby incorporated by reference.

As shown in FIG. 6, the elongated surface 56 comprises the whole of the wider region and it has a nonuniform width which has three regions CW1, CW2, CW3. The second region CW2 is approximately equal to the tape track width. The first and third regions CW1, CW3, respectively, have an equal width which is greater than the tape track width and approximately five to six millinches less than the distance between the two facing surfaces 54a, 54b. The five to six millinches difference between the widths CW1, CW3 and the distance between the two facing surfaces is filled with glass to secure the core 26 within the transducer support 24, as previously mentioned. Further, this amount of glass is sufficient to magnetically isolate the core 26 from the transducer support 24.

As tape 28 runs across the wear surface, which is of uniform height but nonuniform width, provided by the combination of the facing surfaces 54a, 54b, elongated surface 56, and the nonmagnetic material 58, the wear surface will experience a pressure that is nonuniform along the length of the wear surface (i.e., along longitudinal axis 62). So long as the height of the wear surface remains uniform, the nonuniform pressure will tend to be higher in the narrower region of the facing surfaces 54a, 54b than in the wider region of the elongated surface 56.

Initially, the wear surface is in an unworn condition, and as the tape 28 begins to advance across the wear surface, the pressure exerted by the tape against the wear surface is reduced over elongated surface 56 of the core 26, relative to the pressure exerted against the facing surfaces 54a, 54b. This decrease in pressure over the elongated surface would appear to be undesirable as it will result in a separation between the tape and the elongated surface, leading to spacing loss between the gap 50 and the tape. However, the nonuniform pressure results in a nonuniform wear across the wear surface, such that after a short initial break-in period, the pressure becomes uniform.

The short initial break-in period can be accelerated or eliminated during the manufacture of the magnetic head through the use of a highly abrasive tape such as diamond or cromium dioxide lapping tape, as will be described in more detail below.

Due to the initial nonuniform wear on the wear surface the elongated surface 56 surrounding the gap 50 becomes raised with respect to the facing surfaces 54a, 54b which forms the wear surface into a hill shape with the gap 50 at the apex. The hill is approximately fifty microinches higher than the facing surfaces 54a, 54b. Due to this height differential, the pressure of the tape 28 on the elongated surface 56 in the area of the gap 50 increases. Thus, the pressure of the tape on the wear surface, which was initially reduced over the elongated surface as compared to the facing surfaces quickly stabilizes to become approximately uniform along the length of the wear surface (i.e., along the longitudinal axis 62).

Once the pressure has become uniform, the wear surface begins to wear down uniformly, and the elongated surface 56 in the area of the gap 50 remains raised with respect to the facing surfaces 54a, 54b. Thus, the wear surface experiences nonuniform wear at a substantially uniform height profile and substantially uniform wear at a nonuniform height profile.

The process of wear on the wear surface is self-adjusting for the life of the tape head. If the raised region of the elongated surface 56 in the area of the gap 50 becomes too high or too low the rate of wear in that area will accordingly increase or decrease.

The portions of the transducer support 24 and the core 26 which are raised with respect to the remaining portion of the transducer support provide an air barrier on a side of the raised area as the tape 28 travels across the tape facing surface 22 (shown in FIGS. 2 and 3). As the tape 28 advances across the tape facing surface 22, air is also caused to move. As previously mentioned, any separation of the tape from the raised portion will result in a reduced magnetic coupling between the gap 50 and the tape 28, hence, air must be prevented from flowing under the tape as the tape travels across the raised portion.

Another advantage to the dimensions of the magnetic head is the reduction in the possibility of air flowing under the tape as the tape crosses the wear surface. As previously mentioned, core widths CW1 and CW3 are equal. Core widths CW1 and CW3 are also substantially less than the lengths FL1 and FL2 of facing surfaces 54a, 54b, respectively. The facing surface lengths FL1 and FL2 will be much less in a helical tape drive assembly, however, FL1 and FL2 will still be much greater than CW1 and CW3. Because air flowing under the tape 28 will strike the extended portion of the core 26 prior to striking the raised portions of the transducer support 24 and because the width CW1, CW3 of the core 26 is less than the lengths FL1, FL2 of the facing surfaces 54a, 54b, the air will be channeled toward the sides of the tape. Thus, air is prevented from flowing between the tape 28 and the gap 50.

To further enhance the aerodynamics of the raised portions, the elongated surface 56 need not be rectangular, but may instead be trapezoidal or rounded, or of various other elongated shapes. These other shapes provide a smaller initial strike surface for the air to hit, and thus, increase the flow of air to the sides of the tape. Moreover, these shapes may also reduce the risk of tape damage.

Additionally, since the region surrounding gap 50 of the core 26 is raised and remains raised for the life of the tape head, any air which does not follow the guidance of the above dimensions and flows under the tape as the tape crosses the wear surface is forced around the sides of the hill provided and the separation between the gap 50 and the tape 28 is reduced as compared to the separation between the tape and the facing surfaces 54a, 54a. Thus, the tape remains in intimate contact with the gap 50, thereby minimizing spacing loss.

Minimizing spacing loss increases the magnetic coupling between the gap and the tape. This allows the gap length (shown in FIG. 5) to be reduced while still maintaining a sufficient magnetic coupling between the gap and the tape. Reducing the gap length permits smaller bits of data to be read from the tape, and hence, higher data densities can be stored on the tape. The strength of the magnetic coupling is further reduced by the back gap leakage produced in the area of the pole tip height Gh (i.e., throat thickness or gap height, shown in FIG. 5). However, because the invention permits the tape 28 to be kept in intimate contact with the gap 50, sufficient magnetic coupling is provided through a reduced gap length.

The pole tip height Gh determines the life of the tape head, because as the elongated surface 56 of the core 26 wears, the pole tip height Gh decreases until it has been fully reduced such that the resulting gap is between the tips 64 shown in FIG. 5 of the core 26 which is too large to provide sufficient magnetic coupling between the gap and the tape.

Since the reduction in gap-to-tape separation is achieved by virtue of the geometry of the wear surface, rather than by increasing overall pressure on the wear surface, the overall rate of wear of the wear surface is less than the overall rate of wear of a wear surface of uniform width. Thus, the invention allows higher data densities to be stored on the tape with the same tape head life, because the lower wear rate allows for the reduction of pole tip height Gh and increases efficiency.

Additionally, the geometry of the wear surface enables the tape to remain in close proximity to the gap even with a reduced tape tension or with small surface irregularities in the facing surfaces 54a, 54b. In the event of any sudden reduction in the tension of the recording tape or small facing surface irregularities, the raised region surrounding the gap will tend to remain in substantial contact with the tape after the tape has begun to separate from the facing surfaces.

The reduced gap-to-tape spacing also allows the tape head assembly to be utilized with lower density transducers (i.e., increased gap length) at a reduced tape tension. The reduced tape tension decreases the pressure of the tape on the wear surface, thereby minimizing wear on the wear surface. Thus, if the pole tip height Gh remains the same, the tape head life will be increased due to the reduced wear on the wear surface. Alternatively, the strength of the magnetic coupling can be increased by reducing the pole tip height.

Figure 9:
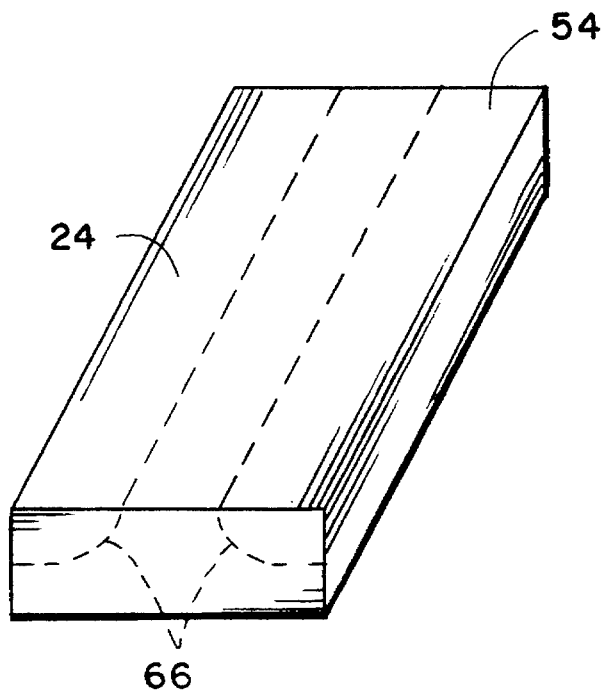
FIG. 9 is an enlarged isometric view of a portion of the transducer support of the magnetic head shown in FIG. 6 prior to manufacturing.
Figure 10:
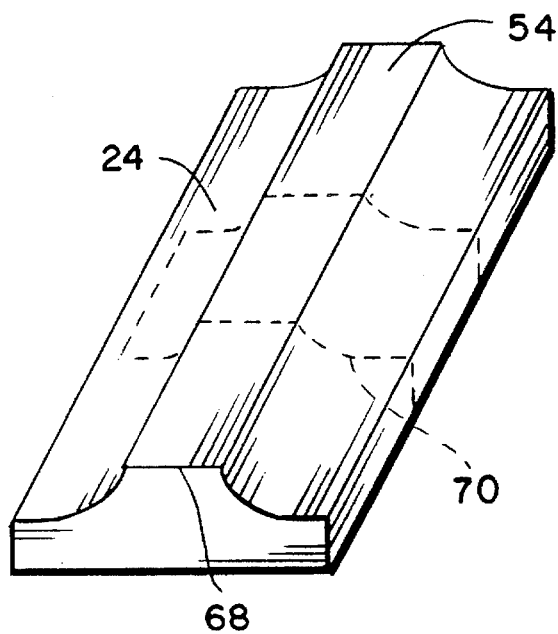
FIG. 10 is an enlarged isometric view of a portion of the transducer support shown in FIG. 6 during manufacturing.
Figure 11:
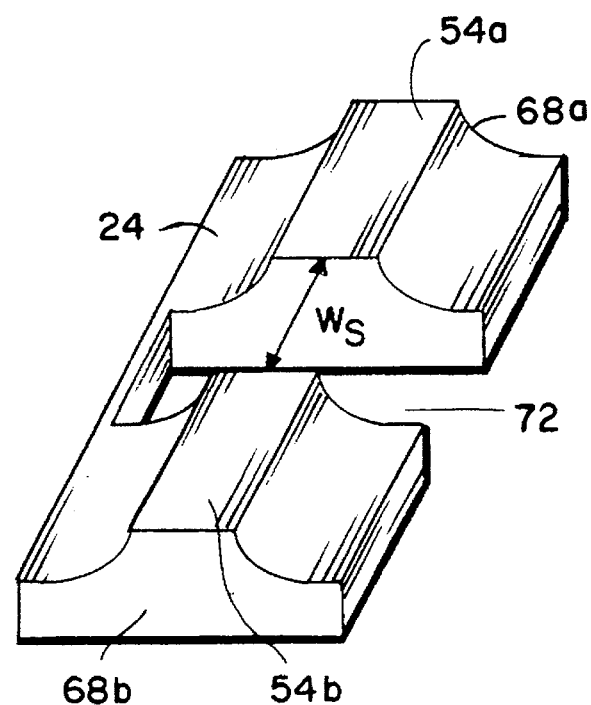
FIG. 11 is another enlarged isometric view of a portion of the transducer support shown in FIG. 6 during manufacturing.

With reference to FIGS. 9–15, one method of producing a tape head with a self-regulating wear surface will be described. Each of the figures depicts an enlarged view of a portion of the transducer support 24 and core 26 shown in dashed outline 52 of FIG. 2. The transducer support 24 is shown in FIG. 9 where it begins as a block having a tape facing surface 54. The block 14 is made of magnetic material which is preferably ferrite and is cut along dashed lines 66 using commonly available grinding contour wheels (i.e., diamond or ceramic rough contour grinding wheels) to form a raised portion 68, shown in FIG. 10. The transducer support 24 is then cut along dashed lines 70, shown in FIG. 10, using a commonly available disk slotting tool to form slot 72, shown in FIG. 11. Slot 72 separates the raised portion 68 into two raised portions 68a and 68b and separates facing surface 54 into two facing surfaces 54a, 54b.

Figure 12:
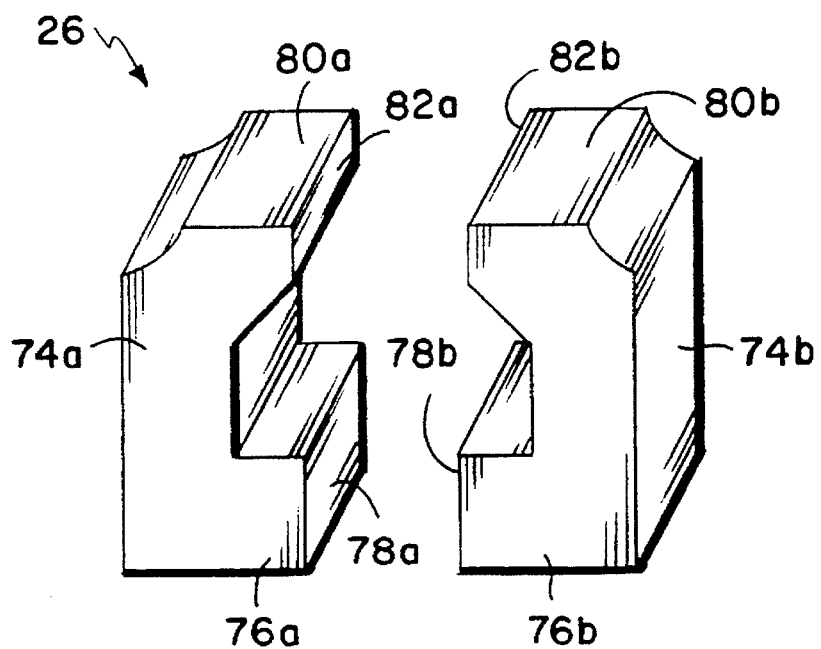
FIG. 12 is an enlarged isometric view of one embodiment of a pre-bonded transducer core according to the principles of the invention.

At the same time the core 26 is produced. As shown in FIG. 12, in one preferred embodiment of the invention, the core 26 begins as two basically identical bracket (i.e., [ ) shaped pieces 74a and 74b. Each bracket 74a, 74b has a lower leg 76a, 76b with a mating surface 78a, 78b and an upper leg 80a, 80b with a mating surface 82a, 82b, respectively.

Figure 13:
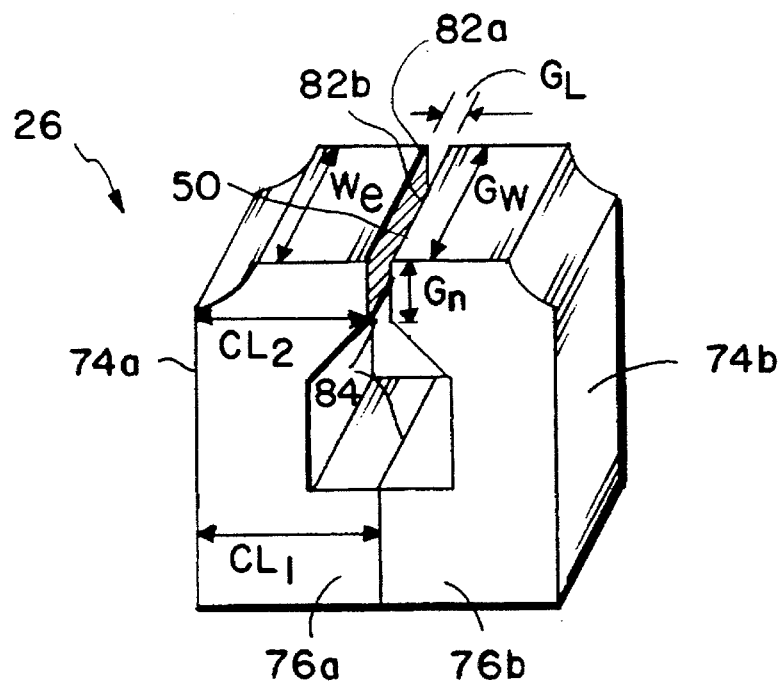
FIG. 13 is an enlarged isometric view of the bonded transducer core shown in FIG. 12.

The two brackets 74a, 74b are then bonded together through the use of a nonmagnetic material 84, for example a type of glass having a high melting point temperature, such that the lower leg mating surfaces 78a, 78b face each other and the upper leg mating surfaces 82a, 82b face each other to form core 26, shown in FIG. 13. Each lower leg 76a, 76b has a length CL1 which is slightly longer than the length CL2 of each upper leg 80a, 80b such that when the two brackets 74a, 74b are joined, the lower leg facing surfaces 78a, 78b are substantially in contact and the gap 50 is provided between the upper leg mating surfaces 82a and 82b.

Figure 14:
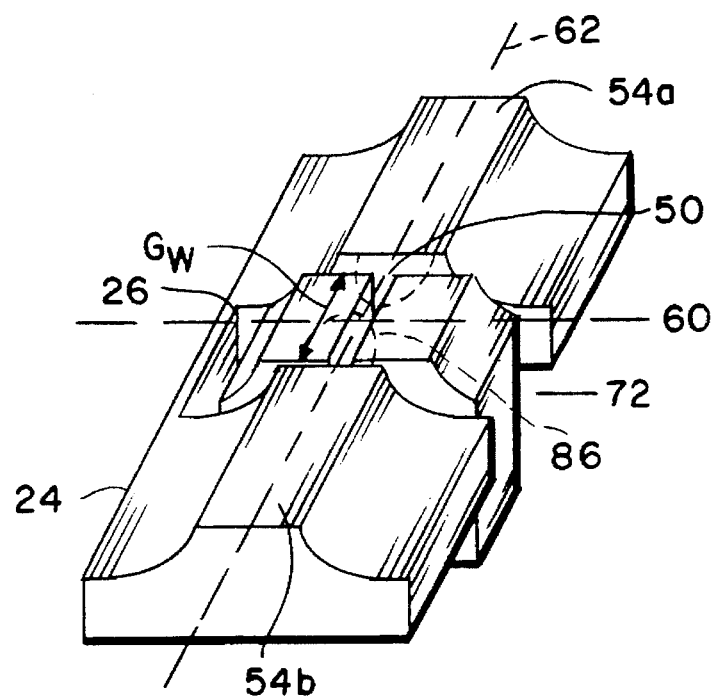
FIG. 14 is an enlarged isometric view of a portion of the transducer support with the core inserted shown in FIG. 6 during manufacturing.

As shown in FIG. 14, the core 26 is then inserted into the slot 72 using conventional methods such that the gap width Gw of gap 50 is parallel to the longitudinal axis 62 of the facing surfaces 54a, 54b. Further, the gap 50 is centered between the facing surfaces with respect to both of the longitudinal axes 60 and 62. This positioning provides that an equal amount of the elongated surface 56 extends on both sides of the facing surfaces 54a, 54b with respect to longitudinal axis 62 and provides that the elongated surface 56 comprises the wider wear surface region.

The gap width Gw and width Wc of the core 26 in FIG. 13 is substantially larger than the tape track width of the stored data and approximately five to six millinches smaller than the width Ws (shown in FIG. 11) of slot 72. Thus, although the glass bonding procedure described above with reference to forming the core 26 from the two brackets 74a, 74b is well known in the magnetic recording art, the prior art does not disclose providing a core 26 with a width which is greater than the track width.

Figure 15:
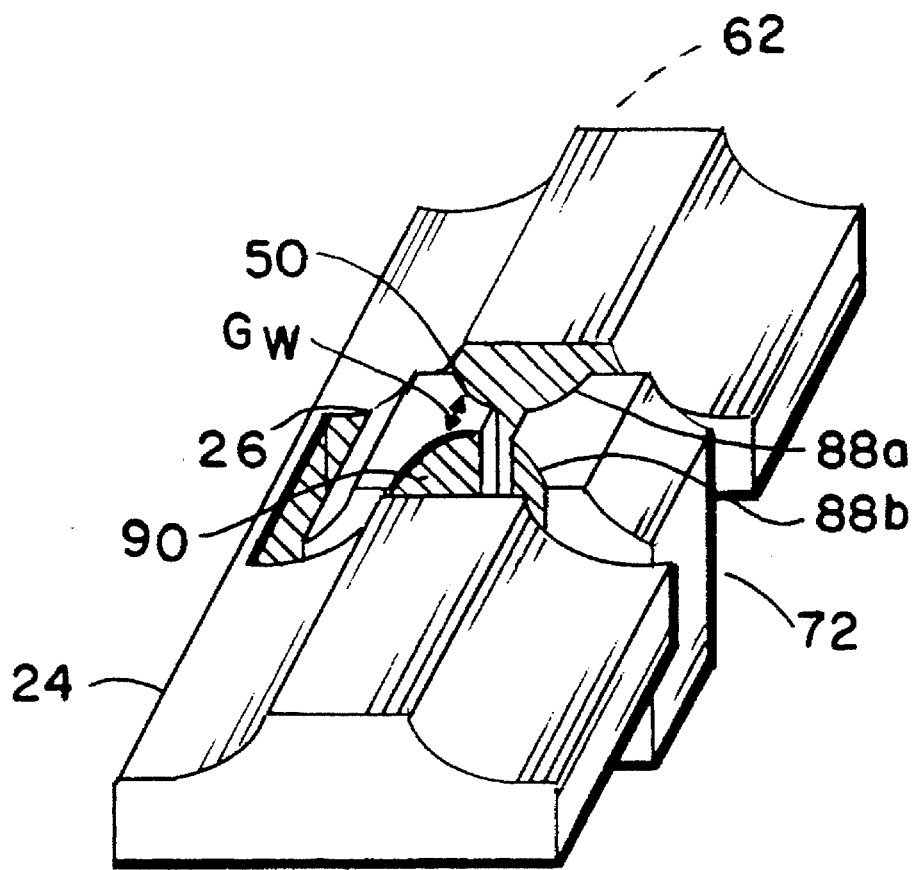
FIG. 15 is an enlarged isometric view of the magnetic head shown in FIG. 6 after manufacturing.

Using a laser, core 26 is cut along dashed lines 86, shown in FIG. 14, to form the notches 88a, 88b as shown in FIG. 15. The amount of material to be removed from the core 26 to form the notches 88a, 88b is very small, and thus, a low power laser can generally be used. The gap width Gw of gap 50, and hence, the core width between the notches 88a, 88b, is reduced such that it is equal to the tape track width.

As a final step the area of the notches 88a, 88b and the space between the slot 72 of transducer support 24 and core 26 is joined with a second nonmagnetic material 90. Again the preferred nonmagnetic material is glass, however, this is a second type of glass with a lower melting point temperature such that the securing of the core 26 within the transducer support 24 does not affect the bond between the two core brackets 74a, 74b (shown in FIG. 12) which was made using nonmagnetic material 84 with the higher melting point temperature. This combination of different nonmagnetic materials will not affect the rate of wear of the wear surface, because, as previously mentioned, the amount of area of the nonmagnetic material 84, 90 (i.e., approximately five to twenty percent) as compared to the amount of area of the magnetic material is insignificant.

Thus, the method described above provides the wear surface shown in FIG. 6 which has two narrower regions including the two facing surfaces 54a, 54b and a wider region including the elongated surface 56. The elongated surface 56 having a nonuniform width comprising three regions CW1, CW2, CW3 across its length CL.

Once the magnetic head has been assembled, a final step in all the methods described herein is to advance diamond lapping tape across the wear surface at approximately the same tape tension as the magnetic recording tape will be held at. This step polishes and finishes the wear surface to provide that it is coplanar. Again, the wear surface will be a flat coplanar surface if it is to be used with a flat media such as a floppy disk or contact hard disk or if it is to be used with a flexible media which is wrapped around the head it will be a curved coplanar surface.

The step of finishing the wear surface with the diamond lapping tape accelerates the initial break-in period of the wear surface such that when the tape drive assembly is complete it is ready for use and has a self-regulating wear surface.

As previously mentioned, the core is one element of a transducer. The other elements of the transducer may be connected to the core either prior to bonding the core within the transducer support or after bonding the core with the transducer support.

Figure 16:
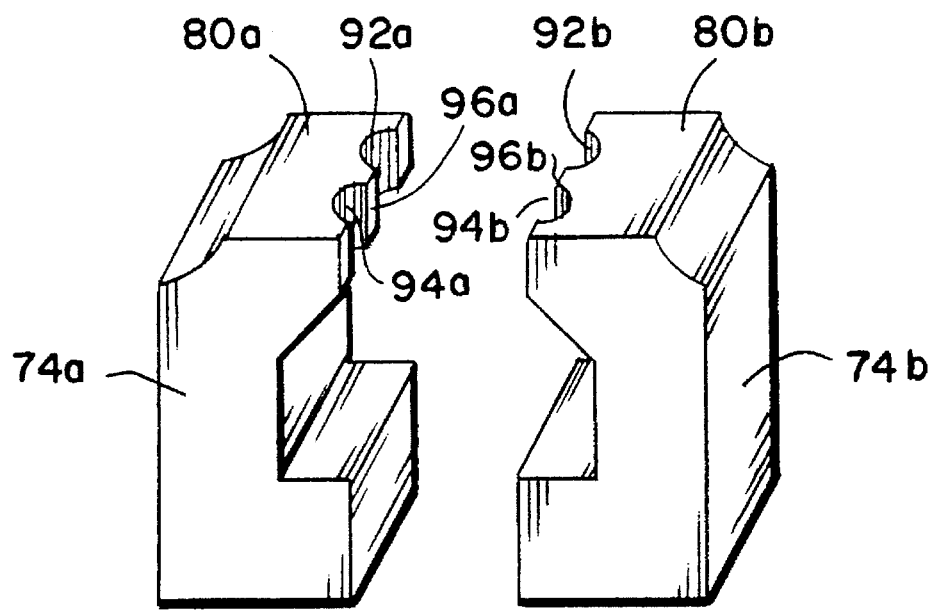
FIG. 16 is an enlarged isometric view of another embodiment of a pre-bonded transducer core according to the principles of the invention.
Figure 17:
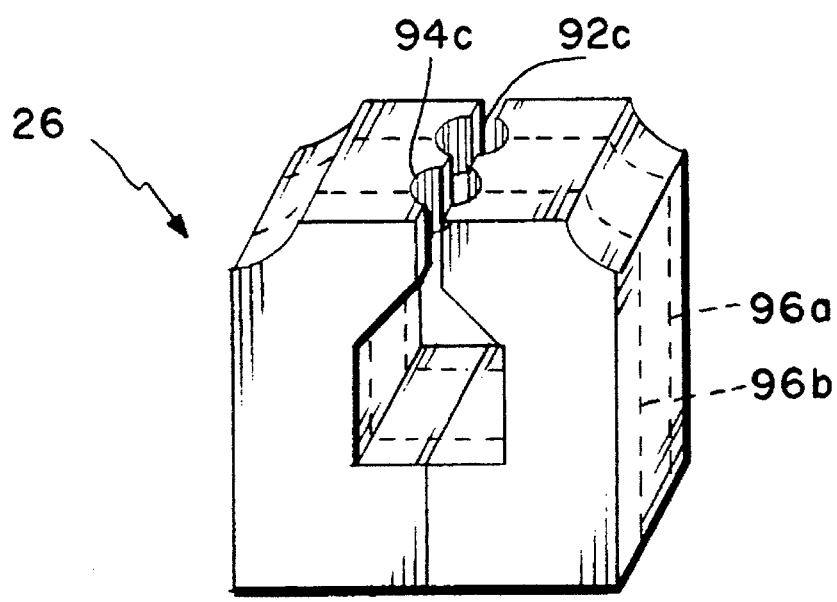
FIG. 17 is an enlarged isometric view of the bonded transducer core shown in FIG. 12.

An alternative method which does not require the use of a laser, but which does require additional steps in the method of producing the core 26 is shown with reference to FIGS. 16 and 17. As shown in FIG. 16, two notches 92a, 94a are cut into upper leg 80a of bracket 74a and two corresponding notches 92b, 94b are cut into upper leg 80b of bracket 74b using a double disk slotting tool prior to bonding the two brackets 74a, 74b to form core 26. Both sets of notches 92a, 94a and 92b, 94b being cut such that the portion 96a, 96b of the upper leg 80a, 80b which remains between them has a width approximately equal to the tape track width.

The two brackets 74a, 74b are then bonded together using the first type of glass 84 with a high melting point temperature, as previously described. However, care must be taken to align the two sets of notches 92a, 94a, and 92b, 94b such that notches 92a and 92b form a hole 92c and notches 94a and 94b form hole 94c between the two ferrite brackets 74a, 74b, as shown in FIG. 17.

The core 26 is then cut along dashed lines 96a, 96b. The dashed lines 96a, 96b are separated by a distance which is approximately five to six millinches less than the width of slot 72 (shown in FIG. 15), and dashed line 96a extends through hole 92c and dashed line 96b extends through hole 94c to produce notches 88a, 88b (shown in FIG. 15). The resulting core 26 is substantially similar to the core shown in FIG. 15 after the laser has been used to cut the notches.

The core 26 is then inserted into slot 72 of the transducer support 24 which results in a similar structure to that shown in FIGS. 6 and 15. Again the second type of glass 90 with the lower melting point temperature is used to secure the core 26 within the transducer support 24. However, due to the additional steps of cutting the notches 92a, 94a, 92b, 94b into brackets 74a, 74b, respectively, prior to bonding the two brackets together, the notches 88a, 88b will already be filled with the first type of glass 84 having the higher melting point temperature.

Another alternative method can be used which avoids the need for a laser and avoids the time consuming step of carefully aligning the two sets of notches 92a, 94a and 92b, 94b (shown in FIG. 16). In this method, one bracket, for example, 74a, is cut with two notches 92a, 94a (shown in FIG. 16) and the other bracket 74b is not cut with notches (shown in FIG. 13). The two brackets 74a, 74b are then bonded with the first type of glass 84 with the higher melting point temperature as discussed above to form the core 26 shown in FIG. 18. Dashed line 96a is shown to extend through the hole created by notch 92a and dashed line 96b is shown to extend through the hole created by notch 94a when the upper leg 80a of bracket 74a is bonded with the upper leg 80b of bracket 74b. The two dashed lines are separated by a distance of approximately five or six millinches less than the width of the slot 72 (shown in FIG. 19). Core 26 is then cut along dashed lines 96a, 96b which forms notches 98a and 98b, and the core 26 is inserted into slot 72 to form the structure shown in FIG. 18.

Figure 18:
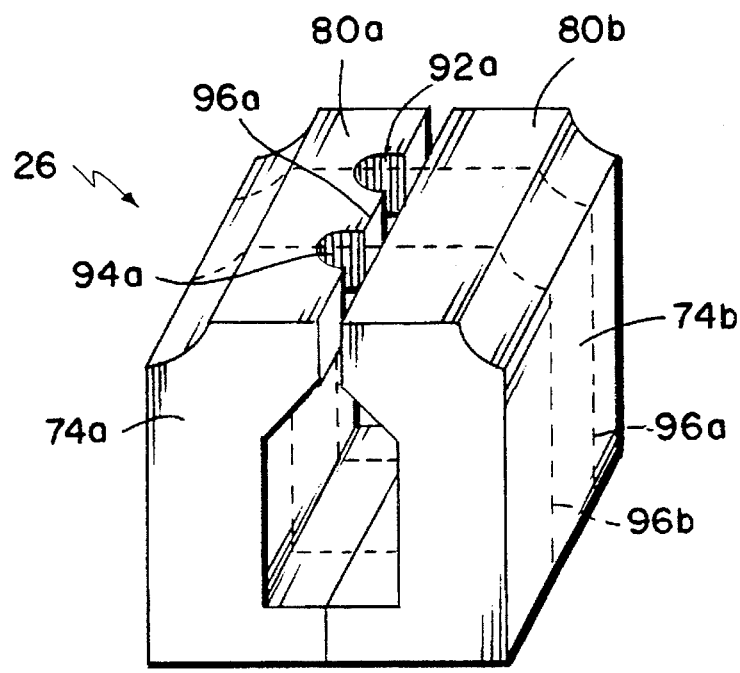
FIG. 18 is an enlarged isometric view of another embodiment of a bonded transducer core.
Figure 19:
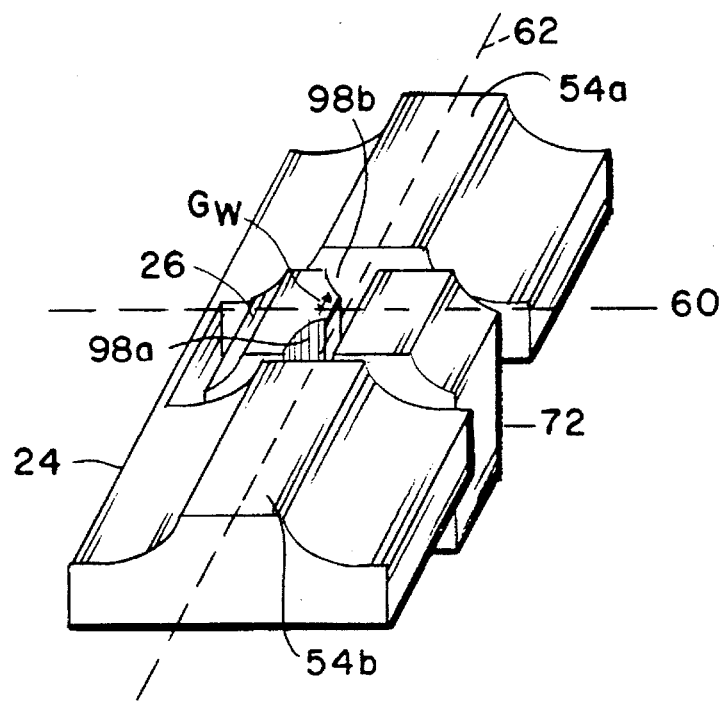
FIG. 19 is an enlarged isometric view of another embodiment of a magnetic head in accordance with the principles of the invention.

Again the portion 96a (shown in FIG. 18) of the upper leg 80a of bracket 74a which remains between the notches 92a, 94a is approximately equal in length to the tape track width such that the gap width Gw of the core embedded within the transducer support 24 of FIG. 18 is approximately equal to the tape track width while the portions of the core which extend on either side of the facing surfaces 54a, 54b in a direction parallel to longitudinal axis 60 are equal to a width of about five or six millinches less than the width of the slot 72. The core 26 is then secured within slot 72 with the second type of glass 90 having the lower melting point temperature, and, as previously discussed, the notches 98a, 98b are already filled with the first type of glass 84 due to the bracket glass bonding procedure used to produce core 26.

Other alternative methods may be used to produce a wear surface with one wider and two narrower wear regions where the elongated surface 56 of the core 26 comprises the wider wear region. Other alternative methods may be used to produce a wider region which includes both the elongated surface 56 of the core 26 as well as a portion of the facing surface 54 of the transducer support 24. With this embodiment a typical core can be used, however, a high powered laser may be necessary as will be discussed.

Figure 20:
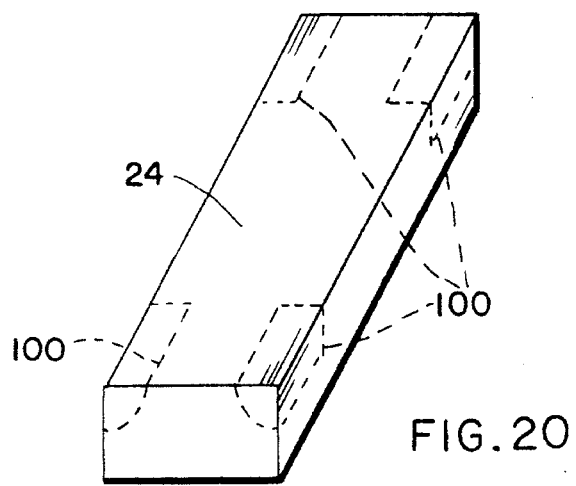
FIG. 20 is an enlarged isometric view of a portion of a transducer support prior to manufacturing of another embodiment of a magnetic head in accordance with the principles of the invention.
Figure 21:
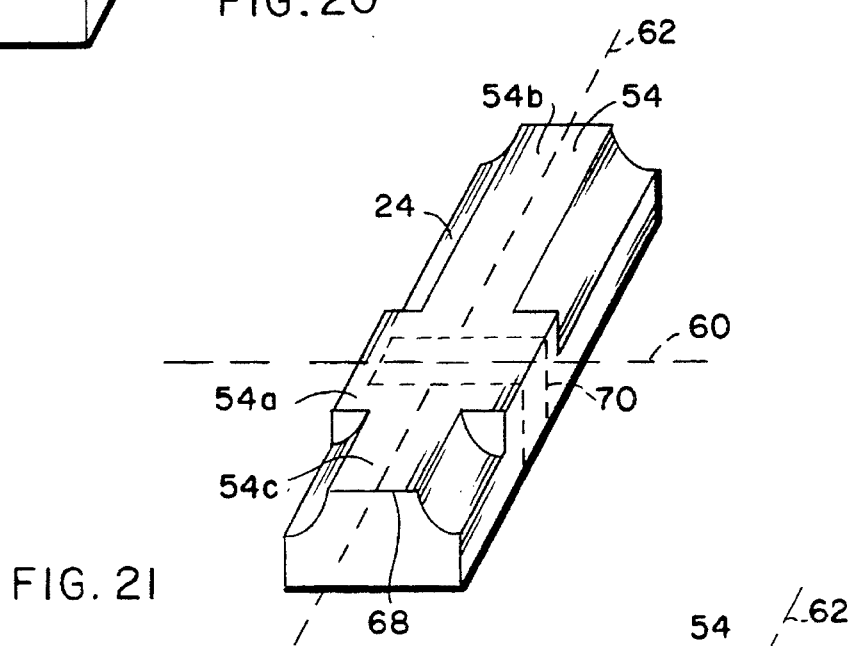
FIG. 21 is an enlarged isometric view of a portion of the transducer support shown in FIG. 20 during manufacturing.

One such method will be discussed with reference to FIGS. 20–22. FIG. 20 includes a portion of the transducer support 24 shown in dashed outline 52 of FIG. 2. The transducer support 24 is cut along dashed lines 100 which results in the transducer support 24 shown in FIG. 21 which has a raised portion 68. Dashed lines 100 are formed through a conventional laser masking technique, and a high powered laser is required to cut along dashed lines 100 provided through the mask, because a substantial amount of the transducer support material must be removed. Raised portion 68 has a tape facing surface 54 which has a wide region 54a and two narrower regions 54b and 54c. The narrower regions 54b, 54c have a longitudinal axis 60 which is perpendicular to a longitudinal axis 62 of the wider region 54a.

Figure 22:
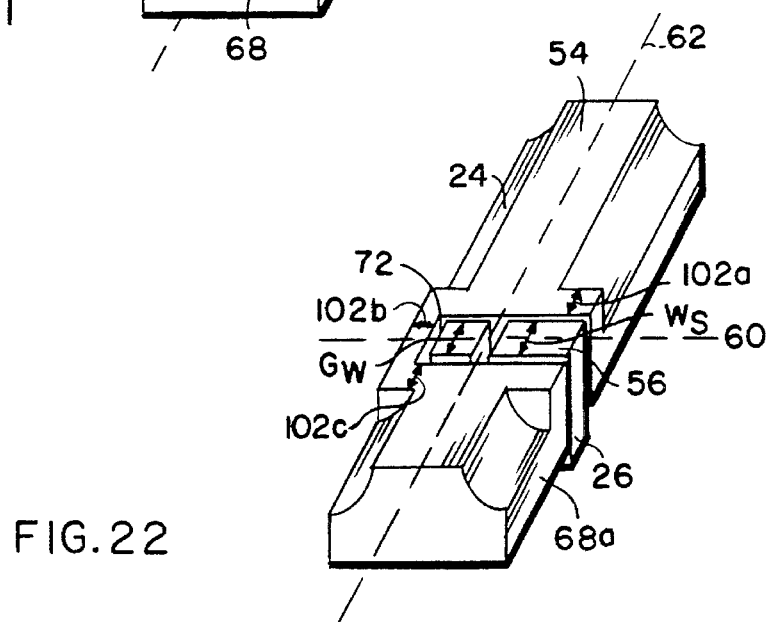
FIG. 22 is an enlarged isometric view of another embodiment of a magnetic head after manufacturing in accordance with the principles of the invention.
Figure 24:
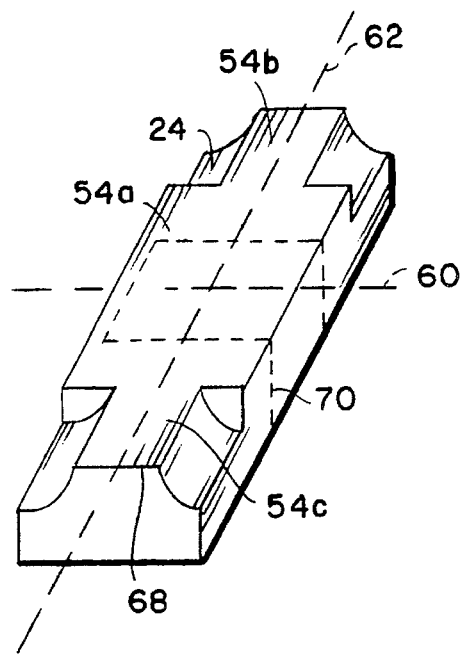
FIG. 24 is an enlarged isometric view of a portion of the transducer support shown in FIG. 23 during manufacturing.

The transducer support 24 shown in FIG. 24 is then cut along dashed line 70 to produce a slot 72 shown in FIG. 22. The slot 72 has a width Ws which is approximately five or six millinches larger than the tape track width, and the slot 72 is centered within the wider region 54a such that a portion of the wider region 54a extends around slot 72 in three directions indicated by arrows 102a, 102b, 102c.

A core 26 is then produced in a similar manner as previously described with reference to FIGS. 12 and 13 with the exceptions that the core width Wc and gap width Gw are each approximately equal to the tape track width and one of the brackets, for example, 74b has longer upper and lower legs 80b, 76b, respectively. Thus, the core 26 does not need any reduction in width along the gap length G1 in the gap 50 area, and the core extends to a greater extent on one side of the gap 50, in a direction parallel to the longitudinal axis 62, than on the other side. The core 26 is then inserted into slot 72 such that a side of bracket 74a is inserted into slot 72 first, and the other side of the core 26 which is a side of bracket 74b is positioned such that it is coplanar with a side 68a of the raised portion 68 of the transducer support 24 which results in the structure shown in FIG. 22.

The structure of FIG. 22 provides a wider wear surface between two narrower wear surfaces where the wider wear surface comprises the elongated surface 56 of a core 26 and the wider portion 54a of the facing surface 54. The core 26 is constructed and positioned such that the gap 50 is centered with respect to both longitudinal axes 60, 62.

Figure 23:
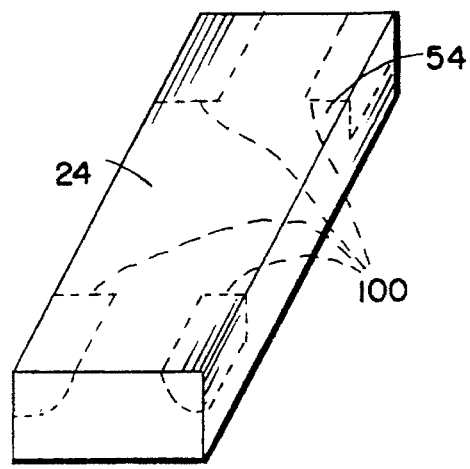
FIG. 23 is an enlarged isometric view of a portion of a transducer support prior to manufacturing of yet another embodiment of a magnetic head in accordance with the principles of the invention.

An alternative method which produces a wider wear surface comprising the elongated surface of the core and a portion of the transducer support 24 will be described with reference to FIGS. 23–26. A portion of a transducer support 24 shown in dashed outline 52 in FIG. 2 is shown in FIG. 23. The transducer support 24 is cut along dashed lines 100 to produce the transducer support 24 shown in FIG. 24 which has a raised portion 68. Again a high powered laser is required to cut along dashed lines 100 due to the substantial amount of the transducer support material which must be removed. Similar to the transducer support shown in FIGS. 21 and 22, raised portion 68 has a tape facing surface 54 which has a wide region 54a and two narrower regions 54b and 54c. The narrower regions 54b, 54c have a longitudinal axis 62, and the wider region 54a has a longitudinal axis 60 which is perpendicular to the longitudinal axis 62.

Figure 25:
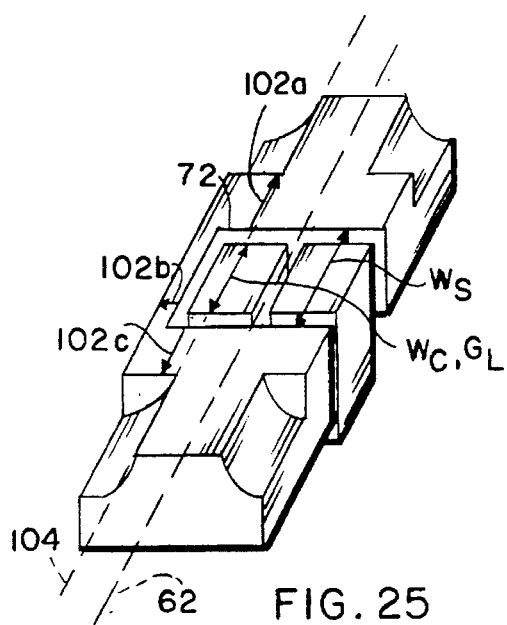
FIG. 25 is an enlarged isometric view of a portion of the transducer support shown in FIG. 24 further along in manufacturing.

The transducer support 24 shown in FIG. 24 is then cut along dashed line 70 using a disk slotting tool to produce a slot 72 shown in FIG. 25. The slot 72 has a width Ws which is approximately five to six millinches greater than the tape track width, and the slot 72 is centered within the wider region 54a such that a portion of the wider region 54a extends around slot 72 in three directions indicated by arrows 102a, 102b, 102c. The transducer support 24 extends to a greater extent on a side of the longitudinal axis 62 which is opposite to the opening of the slot 72.

A core 26 is then produced in a similar manner as previously described with reference to FIGS. 12 and 13 with the exception that the core width Wc and the gap length G1 are each approximately equal to the tape track width. Thus, the core does not need any reduction in width along the gap length G1 in the gap 50 area, and the core is then inserted into slot 72 and the glass bonding procedure previously described is executed which secures the core within the slot.

Figure 26:
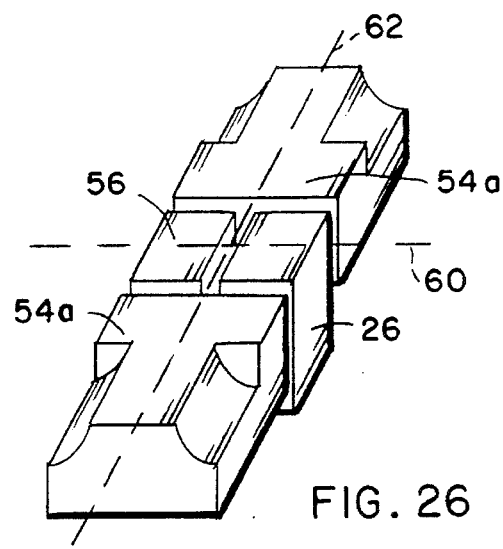
FIG. 26 is an enlarged isometric view of yet another embodiment of a magnetic head after manufacturing in accordance with the principles of the invention.

The structure of FIG. 25 is then cut along dashed lines 104 to produce the structure of FIG. 26 which provides a wider wear surface between two narrower wear surfaces where the wider wear surface comprises the elongated surface 56 of a core 26 and the wider portion 54a of the facing surface 54. The core 26 is constructed and positioned such that the gap 50 is centered with respect to both longitudinal axes 60, 62.

Figure 27:
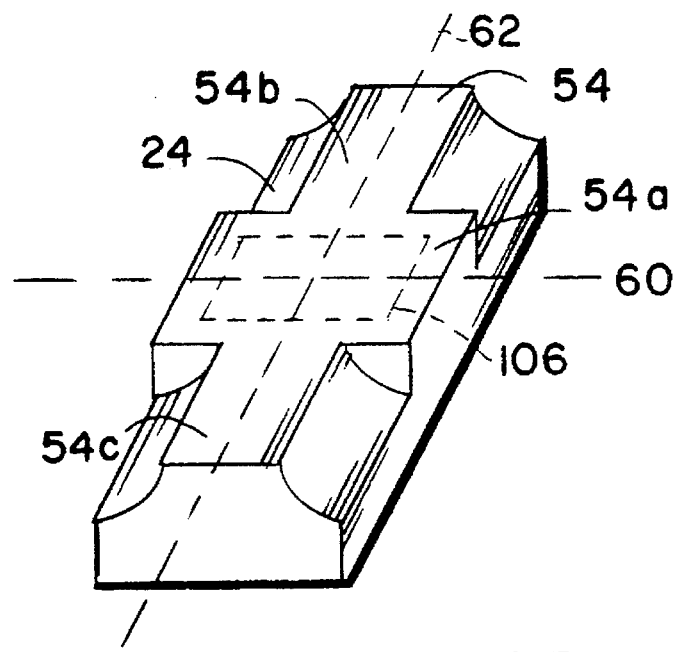
FIG. 27 is an enlarged isometric view of a portion of a transducer support during manufacturing of yet another embodiment of a magnetic head in accordance with the principles of the invention.
Figure 28:
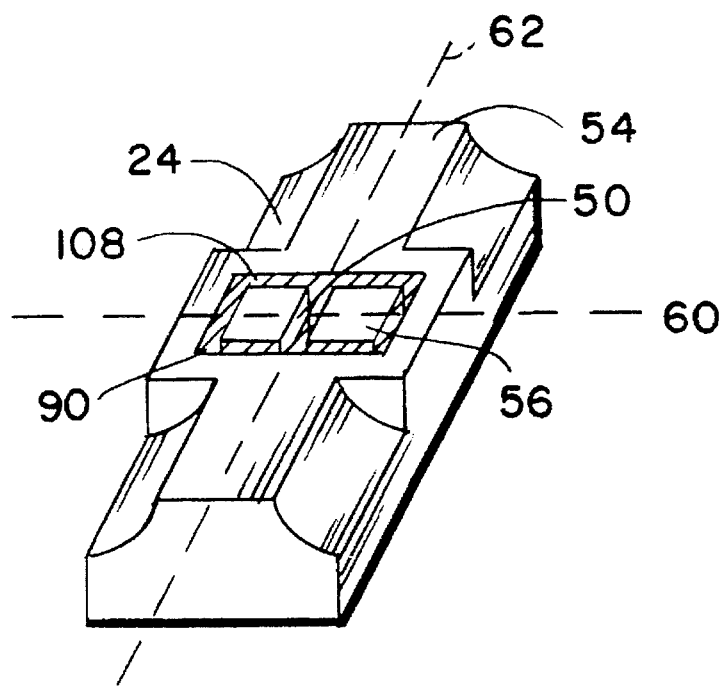
FIG. 28 is an enlarged isometric view of yet another embodiment of a magnetic head after manufacturing in accordance with the principles of the invention.

Another alternative method would be to take the transducer support shown in FIG. 24 and cut along dashed line 106, shown in FIG. 27, with a high powered laser. This would create a hole 108 through the transducer support 24 through which a uniform width core 26 having two substantially identical bracket segments could be inserted and then secured with a second type of glass 90, as shown in FIG. 28.

Having described preferred embodiments and methods of the invention, it will now become apparent to one of skill in the art that other embodiments and methods incorporating their concepts may be used. Accordingly, it is submitted that the invention should not be limited to the disclosed embodiments, but rather should be limited by the spirit and scope of the appended claims.

What is claimed is:

1. A tape head assembly for use with a magnetic recording tape passing thereover, comprising:

a transducer support having a side with two generally coplanar raised elongated facing surfaces against which the tape exerts pressure, the facing surfaces being in generally aligned spaced apart relationship along their longitudinal axis, the longitudinal axis extending in a direction transverse to the direction of tape travel across the facing surfaces and being formed of a magnetic material;

a core including two segments, the core located in the space between the two facing surfaces and being formed of the magnetic material, the core having on one side an elongated surface which extends in the tape travel direction to a greater extent than the facing surfaces, the elongated surface being generally coplanar with the facing surfaces and having a non-uniform width such that there are three basic regions, a first and a third region having an identical width which is smaller than the width of the space between the Two facing surfaces and a second region having a width which is equal to the tape track width and narrower than the width of the first and third regions, the second narrower region being located between the first and third regions and having a gap formed by the two core segments which extends through the second narrower region, the gap being centered between the two facing surfaces; and nonmagnetic material located in the space between the facing surfaces and the core to secure the core between the facing surfaces and located in the gap to secure the two segments of the core together such that the combination of the facing surfaces, the elongated surface of the core and the nonmagnetic material form a generally coplanar wear surface having a geometry with a non-uniform width, the surface area of the nonmagnetic material being from about 5 to 20 percent of the area of the elongated surface of the magnetic core and the area of the two facing surfaces so that the wear of the wear surface is controlled by the wear of the magnetic material of the core and the two facing surfaces, the dimension of the elongated surface extending in the tape travel direction is selected to effect a predetermined wear of the wear surface as the tape advances across the wear surface, wherein the geometry of the wear surface provides a reduced overall rate of wear of the wear surface.

2. The magnetic tape head assembly according to claim 1, wherein the second narrower region includes a portion of the elongated surface on both sides of the gap.

3. The magnetic tape head assembly according to claim 1, wherein the coplanar surface is curved.

4. The magnetic tape head assembly according to claim 1, wherein the width of the sides of the raised facing surfaces which are transverse to the tape travel direction is less than the length of the raised facing surfaces of the transducer support.

5. The magnetic tape head assembly according to claim 1, wherein the sides of the raised facing surfaces which are transverse to the tape travel direction are outwardly tapered.

6. The magnetic tape head assembly according to claim 1, wherein the elongated surface of the core extends in the tape travel direction an equal amount on both sides of the longitudinal axis of the facing surfaces.

* * * * *